United States Patent [19]

Brandenstein et al.

[11] Patent Number: 4,605,113
[45] Date of Patent: Aug. 12, 1986

[54] CLUTCH RELEASE, IN PARTICULAR FOR AUTOMOBILE CLUTCHES

[75] Inventors: Manfred Brandenstein, Eussenheim; Roland Haas, Hofheim, both of Fed. Rep. of Germany

[73] Assignee: SKF Kugellagerfabriken GmbH, Schweinfurt, Fed. Rep. of Germany

[21] Appl. No.: 603,647

[22] Filed: Apr. 25, 1984

[30] Foreign Application Priority Data

Apr. 30, 1983 [DE] Fed. Rep. of Germany ....... 8312805

[51] Int. Cl.⁴ .............................................. F16D 23/14
[52] U.S. Cl. .................................. 192/98; 192/110 B
[58] Field of Search .............. 192/98, 110 B; 308/235, 308/DIG. 4

[56] References Cited

U.S. PATENT DOCUMENTS

| | | | |
|---|---|---|---|
| 4,226,321 | 10/1980 | Ladin | 192/110 B |
| 4,374,556 | 2/1983 | Olschewski et al. | 192/98 |
| 4,505,369 | 3/1985 | Muller et al. | 192/98 |

FOREIGN PATENT DOCUMENTS 2805045  8/1979  Fed. Rep. of Germany ........ 192/98

*Primary Examiner*—Edward G. Favors
*Attorney, Agent, or Firm*—Yuter, Rosen & Dainow

[57] ABSTRACT

A clutch release, in particular for automobile clutches, comprises a sliding sleeve having a radially outwardly directed flange and an annular groove, a clutch release bearing having an outer ring with a flange that slidably abuts the sliding sleeve flange, and a generally oval-shaped spring ring having a pair of mutually parallel guiding surfaces. The spring ring is arranged between the outer ring and the annular groove at points mutually displaced in the axial direction. The bearing is arranged to rotate relative to the sliding sleeve in the circumferential direction within predetermined limits and to move in a radial direction along the guiding surfaces by overcoming a radially acting frictional force between the slidably abutting flanges. The spring ring has a substantially bow-shaped profile and is slotted. The inner ring of the bearing has a radially outwardly directed pressure flange for abutting with the diaphragm spring of a clutch.

9 Claims, 4 Drawing Figures

CLUTCH RELEASE, IN PARTICULAR FOR AUTOMOBILE CLUTCHES

BACKGROUND OF THE INVENTION

The present invention relates to a clutch release, in particular for automobile clutches, comprising a sliding sleeve and a clutch release bearing which radially movably abuts a flange of the sliding sleeve and the nonrotating bearing ring of which is held in the central position by means of an oval spring ring. Upon overcoming a radially acting frictional force, the nonrotating bearing ring is rotatable relative to the sliding sleeve in the circumferential direction within fixed limits and is movable in a radial direction along two mutually parallel guiding surfaces. The spring ring abuts the bore surface of the nonrotating ring at two diametrally opposed places and at 90° removed therefrom engages two diametrally opposed places in an annular groove of the sliding sleeve.

A clutch release of the above-described type is disclosed in U.S. patent application Ser. No. 371,440 filed Apr. 23, 1982 now U.S. Pat. No. 4,570,773. According to this known construction, changes in the dimensions of the sliding sleeve or the oval spring ring cause changes in the magnitude of the radially acting frictional force in the contact area.

SUMMARY OF THE INVENTION

The present invention addresses the problem of creating a clutch release according to which dimensional changes (tolerances) of the cooperating parts give rise to only negligible changes in the radial frictional force between the sliding sleeve and the oval spring ring, so that the self-centering of the clutch release bearing can be effected continuously under similar conditions.

This problem is solved by the present invention, wherein the contact points of the spring ring on the flange of the nonrotating bearing ring and the contact points in the annular groove of the sliding sleeve are arranged mutually displaced in the axial direction, and wherein the oval spring ring is bow-shaped in the axial direction.

A further characteristic of the invention is that the radius of the annular groove in the sliding sleeve is made greater than the half-diameter of the spring ring. In this way, the contact points between the spring ring and the sliding sleeve can adjust to dimensional changes in the cooperating parts without changing the radial initial stressing force substantially.

The invention will be explained in more detail with the aid of the preferred embodiment shown in the drawings.

DETAILED DESCRIPTION OF THE PREFERRED EMBODIMENT

Figure 1:
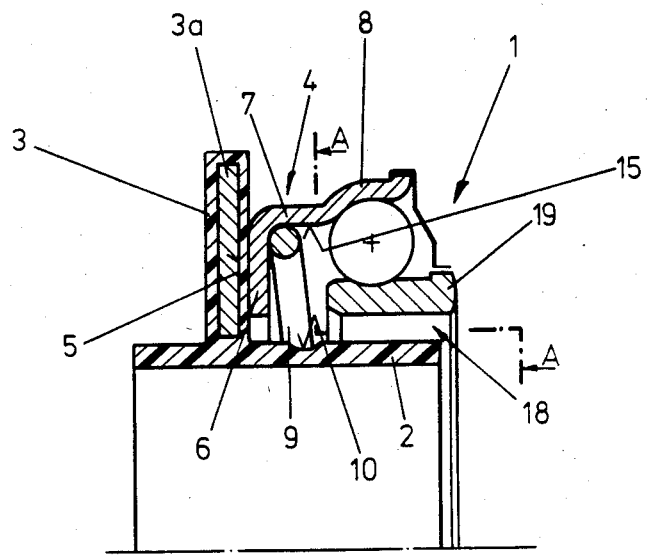
FIG. 1 shows an axial section of a clutch release according to the invention.
Figure 2:
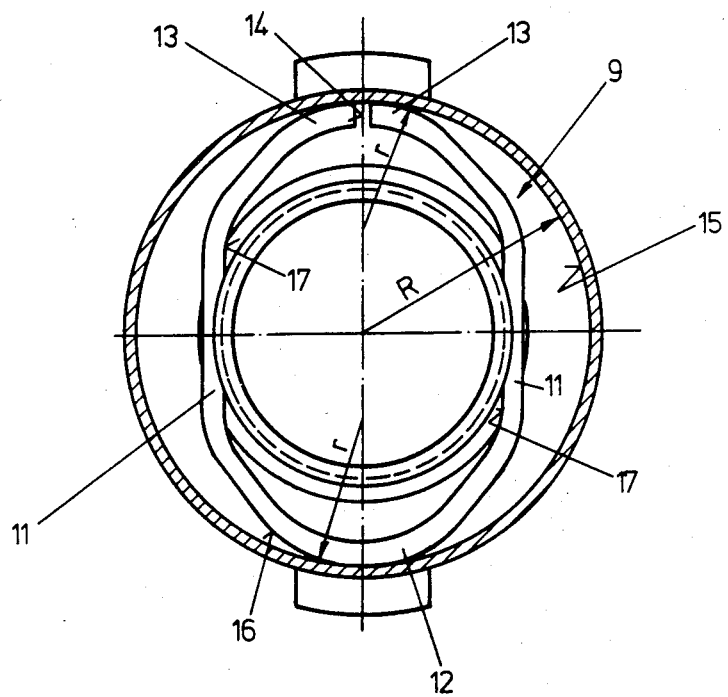
FIG. 2 shows a view along section A—A of the clutch release shown in FIG. 1, without the set of rolling bodies and the inner ring and with an inventive oval spring ring.
Figure 3:
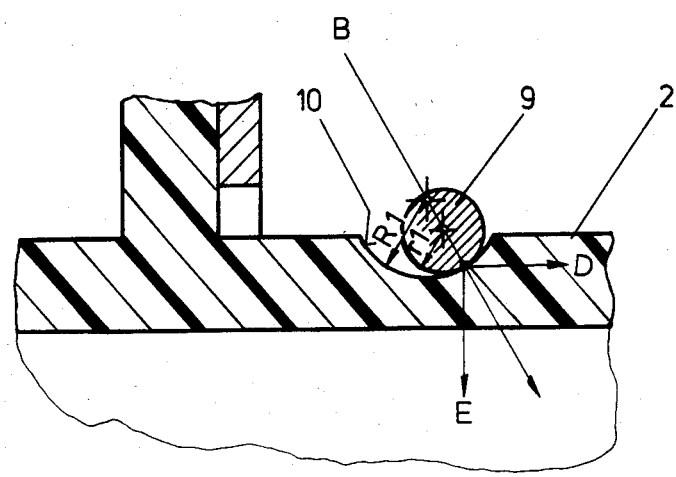
FIG. 3 shows an enlarged cut-away view of the sliding sleeve with the spring ring arranged in the annular groove.
Figure 4:
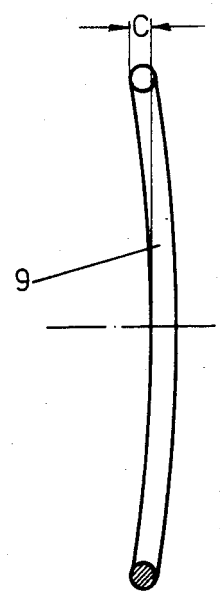
FIG. 4 shows a side view of the separately shown spring ring.

FIGS. 1-3 illustrate a clutch release comprising a clutch release bearing 1 and a sliding sleeve 2. The sliding sleeve 2 is made of plastic and provided with an integrally formed pressure flange 3 which has a reinforcement insert 3a of metal. The release lever (not shown) of the clutch presses against the side of the flange 3 which faces away from the clutch, thereby displacing the sliding sleeve 2 with the clutch release bearing 1 to the right. The outer ring 4 of the clutch release bearing 1 radially slidably abuts the other side of the flange 3. The contact surface 5 of the outer ring 4 is arranged on a radially inwardly disposed flange 6, which is integrally constructed with the race 8 by way of a cylindrical portion 7. In the bore of the cylindrical portion 7, a generally oval-shaped, slotted spring ring 9 having a bow-shaped profile is inserted which is braced against the flange 6 and in the annular groove 10. The spring ring 9 has two mutually parallel mid-portions 11, a semicircular portion 12 connecting the mid-portions on one side, and two round ends on the other side, which are separated from each other by means of a slit 14. The radius R of the bore 15 in the cylindrical portion 7 and the radius r of the round portions 12, 13 of the spring ring 9 are executed such that between these and the outer ring 4, self-impeding wedge surfaces 16 are formed which secure the spring ring 9 against rotation relative to outer ring 4. The mutually parallel mid-portions 11 of the spring ring 9 engage an annular groove 10 at two diametrally opposite places on the outer surface of sliding sleeve 2 by means of side surfaces 17 and couple the outer ring 4 with the sliding sleeve 2. The radius R1 of the annular groove 10 on the outer surface of the sliding sleeve 2 is greater than the half-diameter r1 of the mid-portion 11 of the generally oval-shaped spring ring 9, and the spring ring is bowed so that its greatest flexure C (FIG. 4), in the installed condition, in the height of the center is produced in the area of the diametrally opposed contact points B in the annular groove 10 of the sliding sleeve 2. The spring ring 9 is arranged with prestress between the flange 6 of the outer bearing ring 4 and the contact points B in the annular groove 10 of the sliding sleeve. In this way in the area of the contact points B between the sliding sleeve 2 and the generally oval-shaped spring ring 9 an initial stressing force is produced, which is broken into a small axial component D and a large radial component E, and which is scarcely changed by changes in dimension of the cooperating parts, that is, when the contact points B in the annular groove 10 are somewhat higher or lower, so that different radial initial stressing forces are avoided. The outer ring 4 can, together with the spring ring 9, by overcoming a radially acting frictional force, the magnitude of which is adjusted according to the initial stressing forces, rotate relative to the sliding sleeve 2 in the circumferential direction within fixed limits when displaced in a radial direction, so that the clutch release bearing 1 is self-centering during operation and is halted in the central position. The inner ring 18 of the clutch release bearing 1 is provided, on the side facing the clutch, with a radially outwardly disposed pressure flange 19, which abuts the diaphragm spring (not shown) of the clutch.

The invention is not restricted to the above-described embodiment. Modifications in the structure of the component parts within the spirit and scope of the invention are readily practicable, and will be apparent to the skilled artisan.

What is claimed is:

1. A clutch release comprising a sliding sleeve having a radially outwardly directed flange, a clutch release bearing having a stationary bearing ring with a radially inwardly directed flange which slidably abuts said flange of said sliding sleeve, and a generally oval-shaped spring ring having a pair of mutually parallel guiding surfaces and arranged between said stationary bearing ring and said sliding sleeve, said stationary bearing ring being rotatable with respect to said sliding sleeve in the circumferential direction within fixed limits and to move in a radial direction along said guiding surfaces by overcoming a radially acting frictional force between said flanges, said spring ring abutting the bore surface of said stationary ring at two diametrically opposed positions and engaging two diametrically opposed positions in an annular groove of said sliding sleeve that are displaced 90° from said two positions of said bore surface, the contact points for said spring ring on said bore surface of said stationary bearing ring and the contact points in said annular groove of said sliding sleeve being mutually displaced in the axial direction, said spring ring having a substantially bow-shaped profile.

2. The clutch release of claim 1, wherein the radius R1 of said annular groove in said sliding sleeve is larger than the half-diameter r1 of said spring ring.

3. The clutch release of claim 1, wherein said flange of said sliding sleeve is provided with a reinforcement insert.

4. A clutch release comprising a sliding sleeve having a radially outwardly directed, reinforced flange and an annular groove, a clutch release bearing arranged to abut said flange, said bearing having an inner ring and an outer ring, and a generally oval-shaped spring ring having a pair of mutually parallel guiding surfaces, said spring ring being arranged between said sliding sleeve and said outer ring, said bearing being rotatable with respect to said sliding sleeve in the circumferential direction within predetermined limits and to move in a radial direction along said guiding surfaces by overcoming a radially acting frictional force, the points of contact between said spring ring and said outer ring being displaced in the axial direction with respect to the points of contact between said spring ring and said annular groove of said sliding sleeve.

5. The clutch release of claim 4, wherein said spring ring has a substantially bow-shaped profile.

6. The clutch release of claim 4, wherein said outer ring has a radially inwardly directed flange which slidably abuts said flange of said sliding sleeve.

7. The clutch release of claim 6, wherein said spring ring contacts the bore surface of said outer ring at two diametrically opposed places and at 90° removed therefrom said spring ring engages said annular groove of said sliding sleeve at two diametrally opposed places.

8. The clutch release of claim 4, wherein said spring ring is slotted.

9. The clutch release of claim 6, wherein said outer ring has a radially outwardly directed pressure flange for abutting with the diaphragm spring of a clutch.

* * * * *